US010044165B1

(12) United States Patent
Cullen

(10) Patent No.: US 10,044,165 B1
(45) Date of Patent: Aug. 7, 2018

(54) START-UP AND STABILIZATION OF MODE-LOCKED LASERS

(71) Applicant: Rockwell Collins, Inc., Cedar Rapids, IA (US)

(72) Inventor: Thomas J. Cullen, Ellicott City, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/487,104

(22) Filed: Apr. 13, 2017

(51) Int. Cl.
| H01S 3/10 | (2006.01) |
| H01S 3/067 | (2006.01) |
| H01S 3/11 | (2006.01) |
| H01S 3/13 | (2006.01) |

(52) U.S. Cl.
CPC ...... *H01S 3/10053* (2013.01); *H01S 3/06791* (2013.01); *H01S 3/1109* (2013.01); *H01S 3/1305* (2013.01); *H01S 3/1307* (2013.01); *H01S 2301/02* (2013.01)

(58) Field of Classification Search
CPC .. H01S 3/10053; H01S 3/1307; H01S 3/1109; H01S 3/06791; H01S 3/1305; H01S 2301/02
See application file for complete search history.

(56) References Cited

U.S. PATENT DOCUMENTS

| 4,665,524 A * | 5/1987 | Cotter | H01S 3/1109 372/13 |
| 5,367,529 A * | 11/1994 | Holsinger | H01S 3/2383 372/18 |
| 2015/0030045 A1 * | 1/2015 | Hartl | H01S 3/1106 372/38.08 |

* cited by examiner

*Primary Examiner* — Xinning Niu
(74) *Attorney, Agent, or Firm* — Angel N. Gerdzhikov; Donna P. Suchy; Daniel M. Barbieri

(57) ABSTRACT

Methods and systems for controlling start-up and stabilization of mode-locked lasers are disclosed. A laser stabilization method may include: receiving a laser beam generated by a mode-locked laser; generating a current based on the laser beam received, wherein the generation of the current generates a radio frequency (RF) waveform; amplifying the RF waveform to a level suitable to be processed by a mixer communicatively coupled with the mode-locked laser; and adjusting a phase of the amplified RF waveform to compensate for effects of environmental changes on the laser beam generated by the mode-locked laser.

16 Claims, 4 Drawing Sheets

START-UP AND STABILIZATION OF MODE-LOCKED LASERS

BACKGROUND

Mode-locking is a technique in optics by which a laser can be made to produce pulses of light of extremely short durations. Mode-locked lasers are inherently sensitive to environmental conditions. It is difficult to initiate mode-locking and to maintain a stable condition over an extended period of time with low timing jitter (that is, with low deviation from true periodicity of a periodic signal).

SUMMARY

In one aspect, embodiments of the inventive concepts disclosed herein are directed to a laser system. The laser system may include an oscillator configured to provide an oscillating signal and a mixer configured to receive the oscillating signal and produce an intermediate frequency. The laser system may also include a phase-locking loop circuit configured to receive the intermediate frequency and produce a laser drive voltage. The laser system may further include a mode-locked laser configured to receive the laser drive voltage and produce a laser beam in response to the laser drive voltage. The laser system may further include a cavity stability sensor. The cavity stability sensor may be configured to: receive the laser beam produced by the mode-locked laser; generate a current based on the laser beam received, wherein the generation of the current generates a radio frequency (RF) waveform; amplify the RF waveform to a level suitable to be processed by the mixer; and adjust a phase of the amplified RF waveform to initiate mode-locking and to compensate for effects of environmental changes on the laser beam produced by the mode-locked laser.

In a further aspect, embodiments of the inventive concepts disclosed herein are directed to a laser system. The laser system may include an oscillator configured to provide an oscillating signal and a mixer configured to receive the oscillating signal and produce an intermediate frequency. The laser system may also include a phase-locking loop circuit configured to receive the intermediate frequency and produce a laser drive voltage. The laser system may further include a mode-locked laser configured to receive the laser drive voltage and produce a laser beam in response to the laser drive voltage. The laser system may further include a cavity stability sensor. The cavity stability sensor may be configured to: receive the laser beam produced by the mode-locked laser; generate a current based on the laser beam received; amplify the current to produce an amplified signal; detect noises in the amplified signal; and generate a voltage signal indicating the detected noises to a laser controller configured to adjust operations of the mode-locked laser based on the detected noises.

In another aspect, embodiments of the inventive concepts disclosed herein are directed to a laser stabilization method. The laser stabilization method may include: receiving a laser beam generated by a mode-locked laser; generating a current based on the laser beam received, wherein the generation of the current generates a radio frequency (RF) waveform; amplifying the RF waveform to a level suitable to be processed by a mixer communicatively coupled with the mode-locked laser; and adjusting a phase of the amplified RF waveform to compensate for effects of environmental changes on the laser beam generated by the mode-locked laser.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
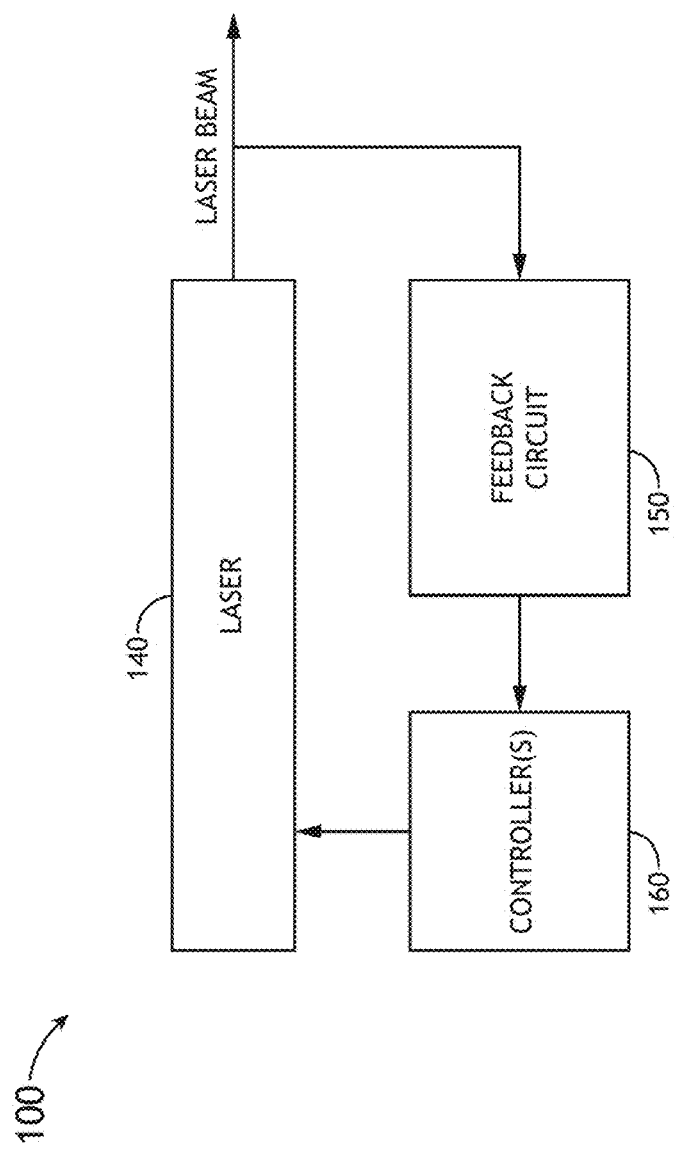
FIG. 1 is a block diagram depicting an exemplary mode-locked laser system configured according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to methods and systems for controlling start-up and stabilization of mode-locked lasers. It is contemplated that mode-locked lasers configured in accordance with embodiments of the inventive concepts may dynamically adapt to changing environmental (e.g., temperature) conditions. It is contemplated that such mode-locked lasers may enable the development of low jitter, high speed optically sampled systems, which may be utilized in various applications, including photonic analog-to-digital conversion and the like.

Figure 2:
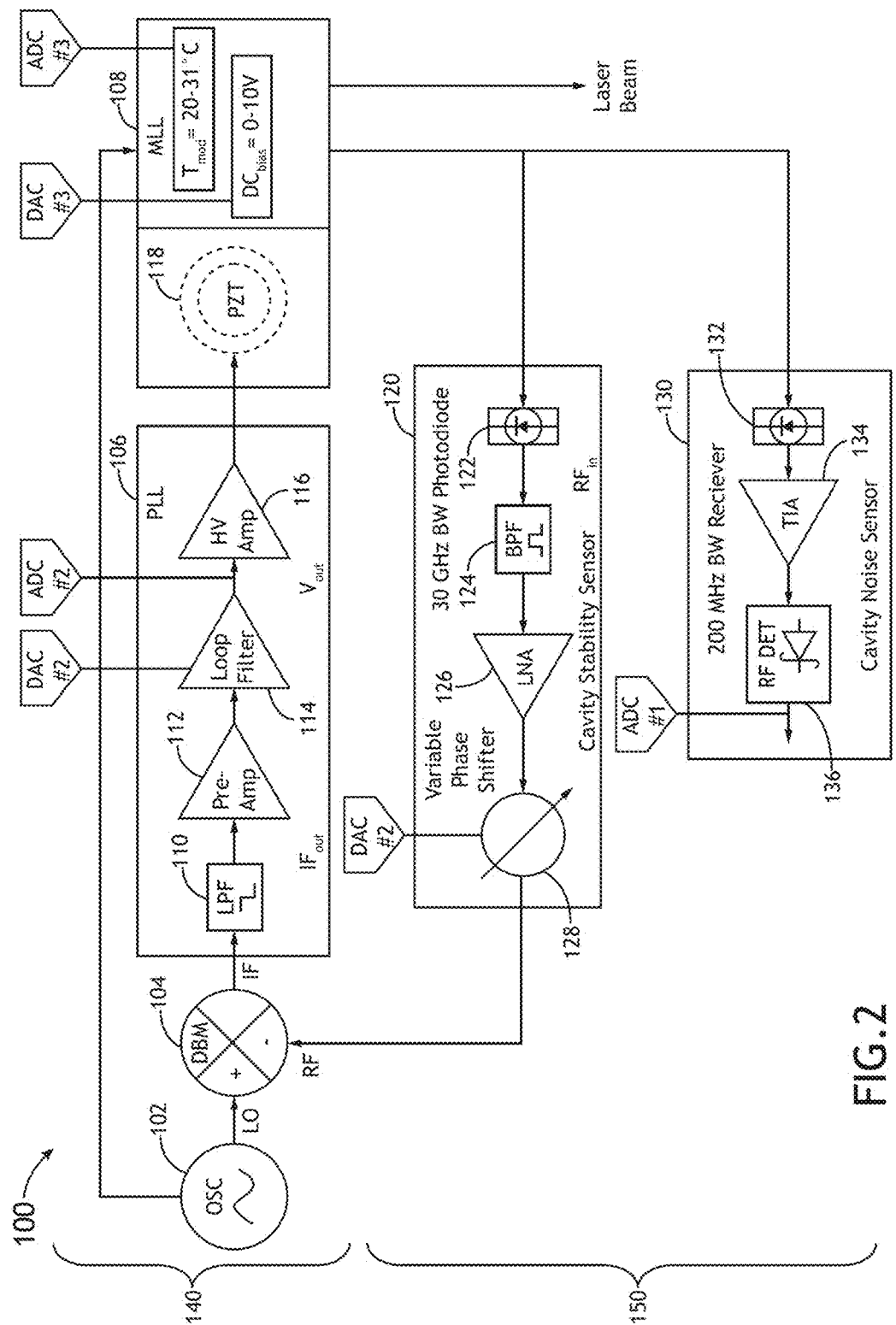
FIG. 2 is a circuit diagram depicting an exemplary laser component and an exemplary feedback control component of an exemplary mode-locked laser system configured according to an exemplary embodiment of the inventive concepts disclosed herein.

Referring generally to FIGS. 1 and 2. FIG. 1 is a simplified block diagram depicting an exemplary mode-locked laser system 100 configured in accordance with an embodiment of the inventive concepts disclosed herein. FIG. 2 is a simplified circuit diagram depicting the laser component 140 and the feedback control component 150 of the mode-locked laser system 100 shown in FIG. 1. It is contemplated that the operations of the laser component 140 and the feedback control component 150 may be controlled by one or more controllers 160, which may be implemented as dedicated processing units, application-specific integrated circuits (ASICs), field-programmable gate arrays (FPGAs), or various other types of processors or processing units.

As shown in FIG. 2, the laser component 140 of the mode-locked laser system 100 may include an oscillator 102 (e.g., a radio frequency oscillator) configured to provide oscillating signals to a mixer 104 (e.g., a double balanced mixer, or DBM). The output (e.g., an intermediate frequency, or IF) of the mixer 104 may be provided to a phase-locking loop (PLL) circuit 106, which is configured to be in communication with a mode-locked laser (MLL) 108.

It is noted that since operations of phase-locking loop mode-locked lasers are well understood by those skilled in the art, detailed operation steps of such mode-locked lasers are not repeated in the present disclosure. In general, the phase-locking loop circuit 106 and the mode-locked laser 108 may form a type of active mode-locked laser where the driving signal is generated from the laser signal itself. In some embodiments, for example, the mode-locked laser 108 may be implemented as a harmonic mode-locked fiber ring laser 108. The phase-locking loop circuit 106 may include a low-pass filter 110, a pre-amplifier 112, a loop filter 114, and a high-voltage amplifier 116 connected in series to process the output of the mixer 104 and provide the processed output (e.g., a laser drive voltage) to a piezoelectric element 118 (e.g., PZT) of the harmonic mode-locked fiber ring laser 108 to drive the operations of the harmonic mode-locked fiber ring laser 108.

It is noted that the operations of the harmonic mode-locked fiber ring laser 108 are inherently sensitive to environmental conditions. For instance, it is noted that changes in environmental conditions such as temperature and the like may change the length of the fiber wrapped around the piezoelectric element 118, effectively changing the length of the cavity of the harmonic mode-locked fiber ring laser 108. Therefore, in some embodiments, a cavity stability sensor 120 may be utilized to sense the effects of cavity length changes on the laser generated by the harmonic mode-locked fiber ring laser 108 and provide a feedback control 150 to help stabilize the mode-locked laser 108 in real-time.

More specifically, as shown in FIG. 2, the cavity stability sensor 120 may include a high-speed photodiode 122 with a bandwidth greater than the repetition rate of the mode-locked laser 108 (e.g., a 30 GHz photodiode) configured to receive the laser generated by the mode-locked laser 108. The current generated by the photodiode 122 may effectively generate a radio frequency (RF) waveform, which may then be received by a band-pass filter (BPF) 124. The band-pass filter 124 may be configured to pass frequencies within a certain selectable range and reject (attenuate) frequencies outside that range. Signals passing through the band-pass filter 124 may be amplified by an amplifier 126 (e.g., a low-noise amplifier, or LNA) to a level that is suitable to the mixer 104. This amplified signal may then be provided to a variable phase shifter 128 prior to being provided to the mixer 104. The variable phase shifter 128 may be configured to adjust the phase of the amplified signal to initially establish mode-locking and to compensate for effects of cavity length changes on the laser generated by the mode-locked laser 108. For instance, the variable phase shifter 128 may be configured to adjust the phase of the amplified signal to help maintain the timing jitter to be within a predefined threshold. It is contemplated that the cavity stability sensor 120 configured in this manner may effectively provide a feedback control 150 that helps stabilize the laser generated by the mode-locked laser 108 in real-time.

It is noted that the mode-locked laser 108 may also produce noise under certain operating conditions. It is therefore contemplated that the mode-locked laser system 100 may include a cavity noise sensor 130 configured to sense the effects of noise on the laser generated by the mode-locked laser 108 and provide an alternative and/or additional feedback control 150 to help stabilize the mode-locked laser 108 in real-time.

As shown in FIG. 2, the cavity noise sensor 130 may include a photodiode 132 (e.g., a photodiode ranging between 200 MHz and 1 GHz) configured to receive the laser generated by the mode-locked laser 108. The current generated by the photodiode 132 may be provided to an amplifier 134 (e.g., a transimpedance amplifier, or TIA). The amplified signal may be provided to a detector 136 configured to detect noises in the amplified signal and generate an output signal indicating the detected noises. In some embodiments, the photodiode 132 of the cavity noise sensor 130 may have a bandwidth ranging between 1 MHz and 2 GHz. In some embodiments, the output signal generated by the cavity noise sensor 130 does not need to be directly connected to any laser component. Instead, the output signal (e.g., a voltage) may be monitored by one or more laser controllers 160. The laser controller(s) 160 may then adjust the phase shifter 128 or modulator bias voltages at least partially based on the output signal provided by the detector 136 to stabilize the laser and maintain the timing jitter and laser noise to be within predefined thresholds.

It is noted that FIG. 2 contains references to analog-to-digital converters (ADCs) and digital-to-analog converters (DACs) at various places in the circuit diagram. It is noted that the ADCs shown in FIG. 2 may indicate signal voltage monitoring points that can be utilized to provide feedback signals to the laser controller(s) 160. For instance, in some embodiments, an ADC (e.g., ADC #1) may be utilized to monitor signal voltage indicating laser noise during phase sweep to detect mode-locking condition. In some embodiments, another ADC (e.g., ADC #2) may be utilized to monitor the voltage $V_{out}$ being provided to the high-voltage amplifier 116. In some embodiments, yet another ADC (e.g., ADC #3) may be utilized to monitor module temperature of the mode-locked laser 108, which may be adjusted to keep the voltage $V_{out}$ within a specified range.

The DACs shown in FIG. 2 may indicate points where the laser controller(s) 160 may set voltages used to determine the operating conditions of the various components. For instance, in some embodiments, a DAC (e.g., DAC #1) may be utilized to set voltages to facilitate sweeping/setting the phase of the cavity stability sensor 120. In some embodiments, another DAC (e.g., DAC #2) may be utilized to set/reset the integrator/loop filter 114. In some embodiments, yet another DAC (e.g., DAC #3) may be utilized to set DC bias of a modulator of the mode-locked laser 108. It is to be understood that the positions of the ADC and DAC points indicated in FIG. 2 are merely exemplary and are not meant to be limiting. It is contemplated that additional ADC and/or DAC points may be placed at various locations in the circuit without departing from the broad scope of the inventive concepts disclosed herein.

Figure 3:
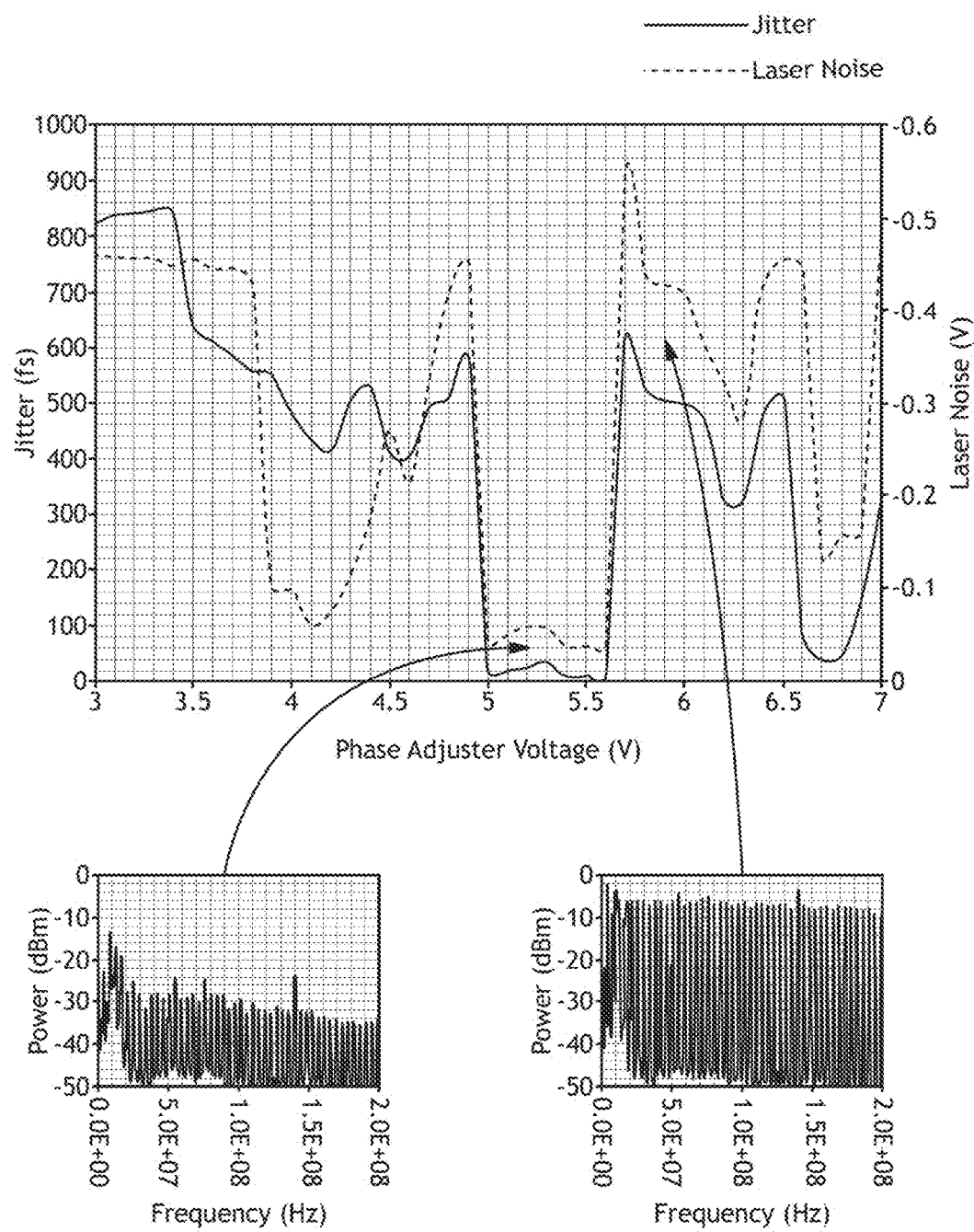
FIG. 3 is an illustration depicting variations in laser noise as a mode-locked laser system sweeps through to locate an initial mode-lock condition.

Referring now to FIG. 3, an illustration depicting variations in laser noise as phase of cavity stability sensor 120 is swept through 180° is shown. Upon start-up, the mode-locked laser system 100 may sweep through 180° to locate an initial mode-lock condition. Once the initial mode-lock condition is determined and the mode-locked laser system 100 starts to operate under the mode-lock condition, the cavity stability sensor 120 and/or the cavity noise sensor 130 may be utilized to help stabilize the laser and maintain the timing jitter and laser noise to be within predefined thresholds.

Figure 4:
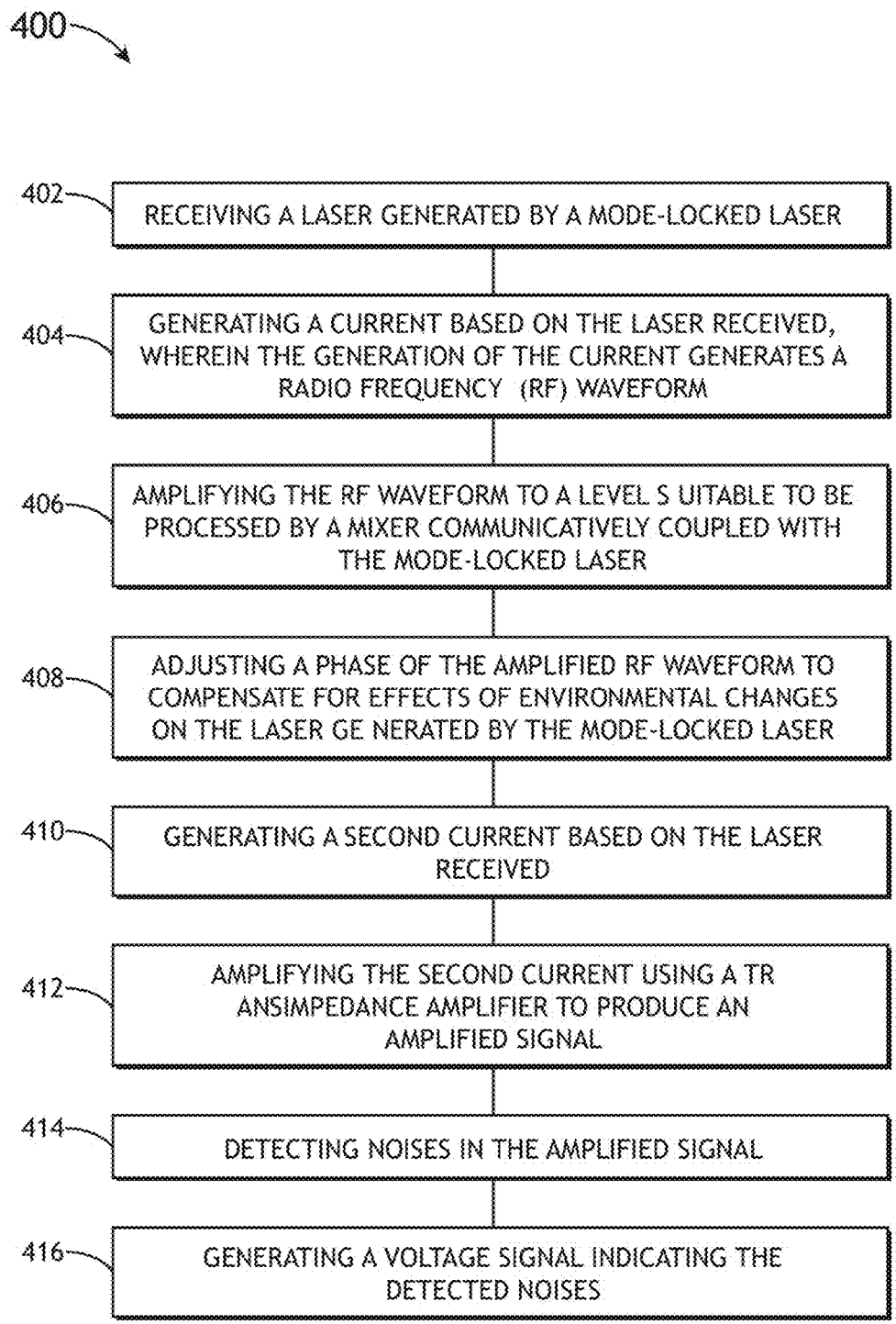
FIG. 4 is a flow diagram depicting an exemplary laser stabilization method according to an exemplary embodiment of the inventive concepts disclosed herein.

Referring now to FIG. 4, a flow diagram depicting an exemplary laser stabilization method 400 configured in accordance with an embodiment of the inventive concepts disclosed herein is shown. A laser generated by a mode-locked laser may be received in a step 402 and a current may be generated based on the laser received in a step 404. The generation of the current may effectively generate an RF waveform, which may be amplified in a step 406 to a level suitable to be processed by a mixer communicatively coupled with the mode-locked laser. The phase of the amplified RF waveform may then be adjusted in a step 408 to compensate for effects of environmental changes on the laser generated by the mode-locked laser as previously described.

The laser stabilization method 400 may also include a step 410 configured to generate a second current based on the laser received. The second current may be amplified in a step 412 to produce an amplified signal. The amplified signal may be provided to a detector in a step 414 to detect noises in the amplified signal. A voltage signal may then be generated in a step 416 to indicate the detected noises. It is contemplated that this voltage signal may be monitored by one or more laser controllers, which may provide appropriate adjustments to help stabilize the laser and maintain the timing jitter and laser noise to be within predefined thresholds as previously described.

As will be appreciated from the above, mode-locked laser systems configured in accordance with embodiments of the inventive concepts disclosed herein may be able to initiate mode-locking faster and may be less sensitive to environmental conditions. Mode-locked laser systems configured in accordance with embodiments of the inventive concepts disclosed herein may also be able to maintain a stable condition over an extended period of time with low timing jitter. It is contemplated that mode-locked laser systems configured in accordance with embodiments of the inventive concepts disclosed herein may enable the development of low jitter, high speed optically sampled systems, which may be utilized in various applications, including photonic analog-to-digital conversion and the like.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A laser system, comprising:
   an oscillator configured to provide an oscillating signal;
   a mixer configured to receive the oscillating signal and produce an intermediate frequency;
   a phase-locking loop circuit configured to receive the intermediate frequency and produce a laser drive voltage;
   a mode-locked laser configured to receive the laser drive voltage and produce a laser beam in response to the laser drive voltage; and
   a cavity noise sensor, the cavity noise sensor including a transimpedance amplifier, the cavity noise sensor configured to:
   receive the laser beam produced by the mode-locked laser;
   generate a current based on the laser beam received;

amplify the current to produce an amplified signal;
detect noises in the amplified signal; and
generate a voltage signal indicating the detected noises to a laser controller configured to adjust operations of the mode-locked laser based on the detected noises.

2. The laser system of claim 1, wherein the cavity noise sensor comprises a photodiode configured to generate the current based on the laser beam received.

3. The laser system of claim 1, wherein the cavity noise sensor further comprises a detector configured to detect noises in the amplified signal and generate a voltage signal indicating the detected noises.

4. The laser system of claim 1, wherein the current generated is a first current, and wherein the laser system further comprises:
a cavity stability sensor configured to:
generate a second current based on the laser beam received, wherein the generation of the second current generates a radio frequency (RF) waveform;
amplify the RF waveform to a level suitable to be processed by the mixer; and
adjust a phase of the amplified RF waveform to initiate mode-locking and to compensate for effects of environmental changes on the laser beam produced by the mode-locked laser.

5. The laser system of claim 4, wherein the cavity stability sensor comprises a photodiode configured to generate the second current based on the laser beam received.

6. The laser system of claim 4, wherein the cavity stability sensor further comprises a band-pass filter configured to filter the RF waveform prior to amplifying the RF waveform.

7. The laser system of claim 4, wherein the cavity stability sensor further comprises a low-noise amplifier configured to amplify the RF waveform to the level suitable to be processed by the mixer.

8. The laser system of claim 4, wherein the cavity stability sensor further comprises a variable phase shifter configured to adjust the phase of the amplified RF waveform to initiate mode-locking and to compensate for effects of environmental changes on the laser beam produced by the mode-locked laser.

9. A laser system, comprising:
an oscillator configured to provide an oscillating signal;
a mixer configured to receive the oscillating signal and produce an intermediate frequency;
a phase-locking loop circuit configured to receive the intermediate frequency and produce a laser drive voltage;
a mode-locked laser configured to receive the laser drive voltage and produce a laser beam in response to the laser drive voltage; and
a cavity noise sensor, the cavity noise sensor including a detector, the cavity noise sensor configured to:
receive the laser beam produced by the mode-locked laser;
generate a current based on the laser beam received;
amplify the current to produce an amplified signal;
detect noises in the amplified signal; and
generate a voltage signal indicating the detected noises to a laser controller configured to adjust operations of the mode-locked laser based on the detected noises.

10. The laser system of claim 9, wherein the cavity noise sensor comprises a photodiode configured to generate the current based on the laser beam received.

11. The laser system of claim 9, wherein the cavity noise sensor further comprises a transimpedance amplifier configured to amplify the current to produce the amplified signal.

12. The laser system of claim 9, wherein the current generated is a first current, and wherein the laser system further comprises:
a cavity stability sensor configured to:
generate a second current based on the laser beam received, wherein the generation of the second current generates a radio frequency (RF) waveform;
amplify the RF waveform to a level suitable to be processed by the mixer; and
adjust a phase of the amplified RF waveform to initiate mode-locking and to compensate for effects of environmental changes on the laser beam produced by the mode-locked laser.

13. The laser system of claim 12, wherein the cavity stability sensor comprises a photodiode configured to generate the second current based on the laser beam received.

14. The laser system of claim 12, wherein the cavity stability sensor further comprises a band-pass filter configured to filter the RF waveform prior to amplifying the RF waveform.

15. The laser system of claim 12, wherein the cavity stability sensor further comprises a low-noise amplifier configured to amplify the RF waveform to the level suitable to be processed by the mixer.

16. The laser system of claim 12, wherein the cavity stability sensor further comprises a variable phase shifter configured to adjust the phase of the amplified RF waveform to initiate mode-locking and to compensate for effects of environmental changes on the laser beam produced by the mode-locked laser.

* * * * *